April 28, 1931.  J. M. SIMPSON  1,802,482

OVERSPEED TRANSMISSION

Filed Sept. 3, 1925  3 Sheets-Sheet 1

INVENTOR.
John M. Simpson,
BY
Hood + Hahn.
ATTORNEYS

April 28, 1931. J. M. SIMPSON 1,802,482
OVERSPEED TRANSMISSION
Filed Sept. 3, 1925 3 Sheets-Sheet 2

INVENTOR.
John M. Simpson,
BY
Hood + Hahn,
ATTORNEYS

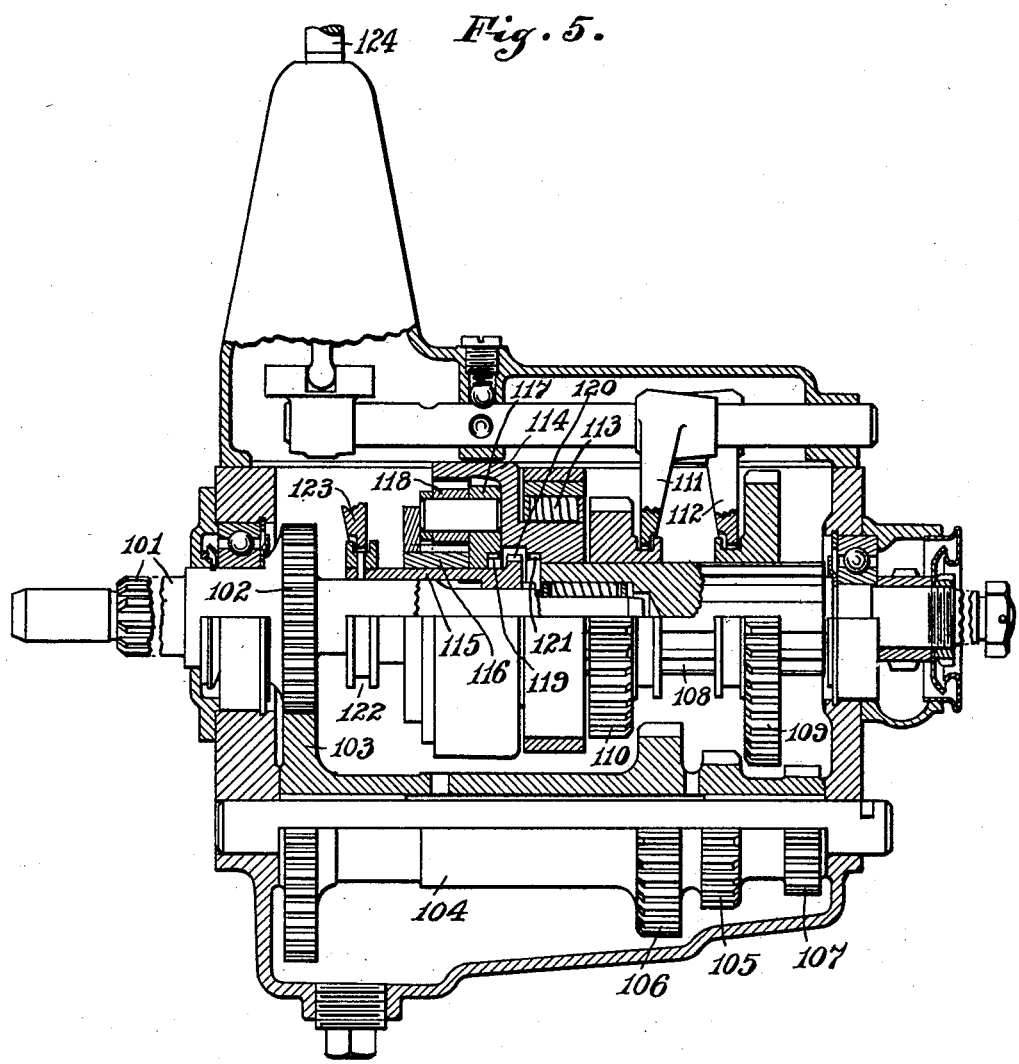

Patented Apr. 28, 1931

1,802,482

UNITED STATES PATENT OFFICE

JOHN M. SIMPSON, OF MUNCIE, INDIANA

OVERSPEED TRANSMISSION

Application filed September 3, 1925. Serial No. 54,180.

In the construction of automobile transmission gears it is the common practice to so proportion the parts that, when the power receiving shaft of the transmission is directly connected to the power delivery shaft of the transmission the engine will have sufficient power to drive the car over the average road to be traversed, making the ordinary grades without the necessity of shifting the gears. Manifestly, with such an arrangement, the maximum speed attainable over level roads will be the result of such piston speeds as to be likely to injure the engine, especially if the maximum speed be maintained for long periods, and the power which may be actually developed by the engine, if more efficiently delivered to the driving wheels, would be capable of driving the car at speeds otherwise unattainable.

Under the ordinary arrangement therefore, the propulsion of the car over level roads at high speeds is considerably lacking in efficiency and is likely to result in objectionable vibrations.

The object of my present invention is to provide a transmission gearing by means of which, over proper road conditions, the car may be propelled at higher speeds, without increased engine speeds, the arrangement being such as to be easily and accurately manipulated and such as to avoid the production of objectionable gear noises.

Figure 1:
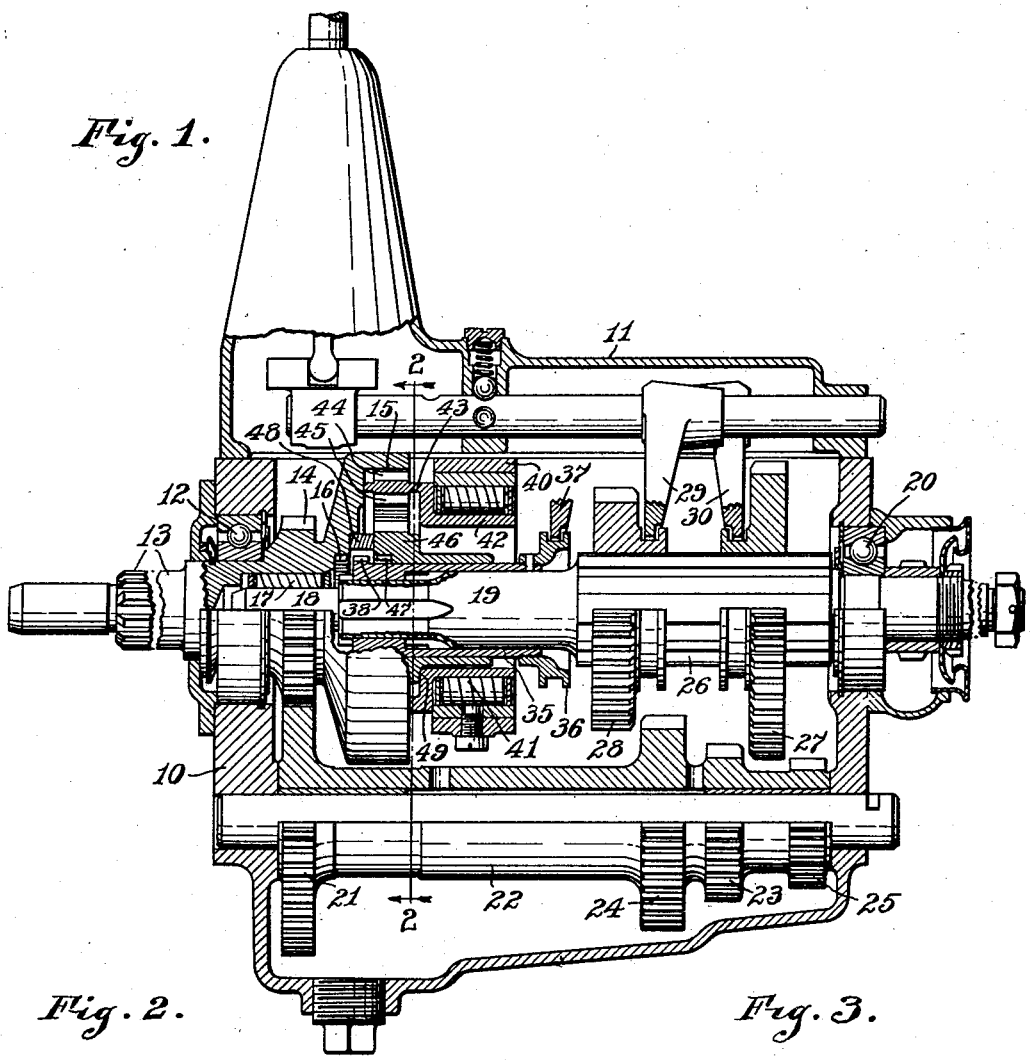
Figure 2:
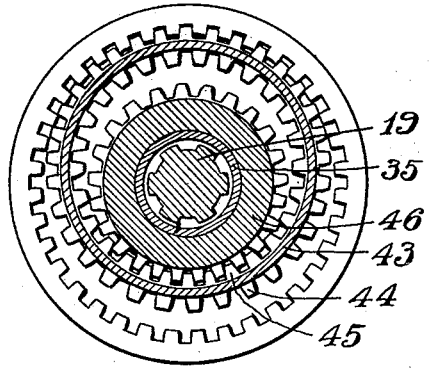
Figure 3:
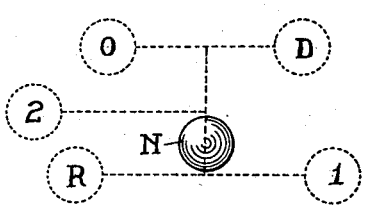
Figure 4:
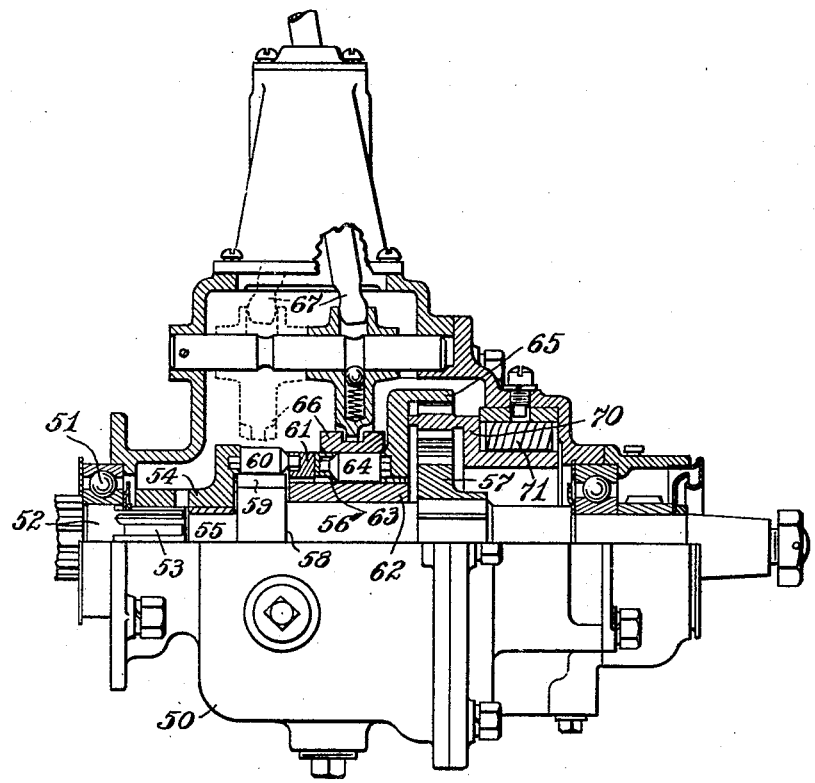

The accompanying drawings illustrate my invention. Fig. 1 is an axial section; Fig. 2 a transverse section on line 2—2 of Fig. 1; Fig. 3 a diagram of the shifting means; Fig. 4 an axial section of a modification in which the over-speed gearing is a separable unit arranged between a standard speed-varying transmission and the propeller shaft, and Fig. 5 a section of another modification of the planetary type.

In the drawings (Figs. 1-3) 10 indicates a suitable enclosing casing provided with a cover 11. Journaled in bearing 12 is a power-receiving element 13 provided with a main spur gear 14 and an over-speed internal gear 15, shaft 13, spur gear 14 and internal gear 15 being most conveniently formed integrally, and provided with an internal clutch element 16.

Within the element 13—14—15 there is a bearing 17 which supports the inner end 18 of the power delivery shaft 19 supported in bearing 20 in casing 10.

Gear 14 meshes with gear 21 on counter-shaft 22, said counter-shaft being provided, as is usual in spur gear transmissions, with a low-speed gear 23, the intermediate spur gear 24 and the reversing gear 25.

Splined at 26, on shaft 19, in the usual manner, is a low-speed gear 27 and intermediate speed gear 28, gear 27 serving also in the usual manner to cooperate with a reversing pinion (not shown) which meshes with gear 25.

Gear 28 may be shifted by fork 29 and gear 27 may be shifted by fork 30.

Splined upon shaft 19, between portions 18 and 26, is a clutch sleeve 35 provided at one end with a grooved collar 36, which receives the shifting fork 37, and at the other end with clutch teeth 38 adapted to interengage with clutch teeth 16.

Removably mounted in the casing 10 is a bearing shell 40 supporting a bearing 41 in which is journaled the tubular hub 42 of a combination gear 43, the axis of said gear being eccentric to the axis of shaft 19. Gear 43 is provided with external teeth 44 which mesh with the teeth of gear 15, and is provided with internal teeth 45 which mesh with the external teeth of the gear 46 which is nested within gear 43 and is journaled upon clutch sleeve 35. Gear 43 is provided with internal clutch teeth 47 which may receive the teeth 38 of the clutch sleeve 35.

The shell of bearing 41 is held against axial movement in the supporting shell 40; a spacing ring 48, between element 13—14—15 and gear 46 limits movement of said gear 46 in one direction while movement of said gear in the opposite direction is prevented by its nesting contact at 49 with gear 43.

Forks 29, 30 and 37 are carried by suitable shifting rails, in a common manner, and are capable of being shifted by a shifting lever.

In Fig. 4 I show an adaptation of my invention in which the over-speed gearing is a separate until which may be readily inserted in the power line between the rear end of the ordinary speed-varying transmission and the forward end of the propeller shaft. In this form the casing 50 is formed to bolt directly upon the rear end of an ordinary speed-varying transmission (not shown) and cooperate with bearing 51 to support the rear end of the power delivery shaft 52 of said ordinary transmission, the rear end of said shaft 52 being splined at 53 to receive the clutch element 54 which forms a support for the forward end 55 of the power-delivery shaft 56 to which is keyed the spur gear 57. Near its forward end shaft 56 is provided with a collar 58 having circumferentially spaced pockets 59 adapted to receive the clutching rollers 60, a circumferential series of which is carried by the clutch element 54. The clutch rollers 60 are carried by the clutch element 54 and a supplemental ring 61 relatively associated with the clutch element 54 and this supplemental ring 61 is non-rotatively associated with a sleeve 62 which is journaled upon shaft 56 and provided in its circumference with a series of roller-receiving pockets 63 into which the clutch rollers 64 may be readily projected. The rollers 64 are carried by an internal gear 65 which is journaled to rotate freely upon sleeve 62. An axially shiftable collar 66 is so proportioned as to be projected into engagement with either set of clutch rollers 60 or 64, said collar being shiftable by any suitable shifting means, as for instance the shifting lever 67.

The internal teeth of gear 65 mesh with the external teeth of a combination gear 70 which is supported in suitable bearings 71 eccentric to the axis of the power-delivery shaft. The internal teeth of the combination gear 70 mesh with the external teeth of gear 57.

In operation under normal operations collar 66 would be shifted to the position indicated in dotted lines in Fig. 4 so as to project clutch rollers 60 into pockets 59 thus locking shafts 52 and 56 together so that the variations due to settings of the standard transmission will be transmitted to shaft 56. When an over-speed is desired the standard transmission will be first set at high speed, where shaft 52 is directly connected to the engine shaft and collar 66 will then be shifted to the position shown in full lines so as to project clutch rollers 64 into the pockets 63 thus connecting gear 65 with shaft 52, whereupon power is delivered through the gear train 65—70—57 to shaft 56.

In Fig. 5 I illustrate a planetary-modification of my invention. In this form the power-receiving shaft 101 carries the gear 102 which meshes with spur gear 103 of the counter shaft 104 carrying low-speed gear 105 intermediate speed gear 106 and reverse-gear 107.

Aligned with shaft 101 is a power-delivery shaft 108 upon which, in a common manner, are splined gears 109 and 110. Gear 109 is capable of either meshing with gear 105 or with a pinion (not shown) which meshes with gear 107. Gear 110 is capable of meshing with gear 106, usual shifting forks 111 and 112 being provided for that purpose.

Concentric with the two shafts, and supported in a suitable bearing 113 is the hub of an internal gear 114 which forms the external gear of a planetary gear train. Splined on shaft 101, and nested within gear 114 is a clutch shaft 115 journaled in the fixed or sun-gear 116. The planetary-gear carrier 117 is journaled upon the clutch sleeve 115 and carries a suitable number of planetary gears 118 which mesh with and lie between gears 114 and 116. The planetary gear carrier 117 is provided with a series of internal clutch teeth 119 adapted to receive the clutch teeth 120 of sleeve 115, said teeth 120 being also receivable in clutch teeth 121 formed in the hub of gear 114. Sleeve 115 is provided at its outer end with a fork groove 122 which receives a shifting fork 123.

The shifting forks 111, 112 and 123 are carried in the usual manner by suitable shifting rails which are arranged to be shifted by shifting lever 124 in a wellknown manner.

It will of course be readily understood that if, instead of an over-speed, an additional forward speed is desired, the result may be attained by reversing the planetary gear train relative to the power-receiving and power-delivery shafts.

The clutch shown in Fig. 4 is of the type shown in the McCarrell Patent No. 1,494,794 and are especially advantageous in the combinations shown because quiet connections may be established at full speed.

The nesting of the internal gear train, so that the teeth of the internal gear, the combination gear and the spur gear are all in the same plane, is quite important because the bearing for the combination gear is in this way freed from twisting or bending stresses.

I claim as my invention:

1. In a speed changing transmission, a driving shaft, a driven shaft, an internal gear carried by one of said shafts, an external gear journaled upon the other of said shafts, a combination gear having external teeth meshing with the internal gear and internal teeth meshing with the external gear, the teeth of the several gears being arranged in the same plane, a fixed bearing for said combination gear and an axially shiftable clutch member fixed upon the shaft upon which the external gear is journaled for engagement with a clutch member fixed to the other shaft or with a clutch member fixed to the external gear.

2. In a speed changing transmission, a driving shaft, a driven shaft aligned therewith, an internal gear carried by one of said shafts, an external gear journaled upon the other of said shafts, a combination gear having external teeth meshing with the internal gear and internal teeth meshing with the external gear, the teeth of said several gears being arranged in the same plane, a fixed bearing for said combination gear, and an axially shiftable clutch member fixed to the shaft upon which the external gear is journaled for engagement with either a clutch member fixed to the other shaft or a clutch member fixed to the external gear.

3. In a speed changing transmission, a driving shaft, a driven shaft aligned therewith, an internal gear carried by one of said shafts, an external gear journaled upon the other of said shafts, a combination gear having external teeth meshing with the internal gear and internal teeth meshing with the external gear, the teeth of said several gears being arranged in the same plane, a fixed bearing for said combination gear, and an axially shiftable clutch member fixed to the shaft upon which the external gear is journaled for engagement with either a clutch member fixed to the other shaft or a clutch member fixed to the external gear.

4. A speed-varying transmission comprising a power-receiving member, having an external gear, an internal gear and a clutch element, a power delivery member co-axial with the power-receiving element, a spur-gear speed-varying driving system connected at one end to said first-mentioned spur gear and connected at the other end with the power delivery element, a spur gear co-axial with the driven element, a clutch member co-axial with the power delivery element and rotatively connected therewith, means by which said clutch member may be shifted into connection either with the first-mentioned clutch element or with said last-mentioned spur gear, and a driving train between said last-mentioned spur gear and the internal gear.

5. A speed-varying transmission comprising a power-receiving member having an external gear, an internal gear and a clutch element, a power-delivery member co-axial with the power-receiving element, a spur-gear speed-varying driving system connected at one end to said first-mentioned spur gear and connected at the other end with the power delivery element, a spur gear co-axial with the driven element, a clutch member co-axial with the power delivery element and rotatively connected therewith, means by which said clutch member may be shifted into connection either with the first-mentioned clutch element or with said last-mentioned spur gear, and a driving train between said last-mentioned spur gear and the internal gear, said driving train comprising a combination gear having external teeth meshing with the internal gear and internal teeth meshing with said last-mentioned spur gear.

6. In change speed transmission gearing for motor driven vehicles, and in combination, a main driving shaft; a transmission shaft arranged in alignment with said driving shaft; a counter shaft arranged to one side of said main driving and transmission shafts; gearing whereby said counter shaft is driven by said main driving shaft; a plurality of cooperating pairs of gears carried by said counter and transmission shafts and whereby the latter may be driven at a plurality of speeds by said counter shaft; a clutch member carried by said main driving shaft; a second clutch member arranged adjacent said first mentioned clutch member; gearing whereby said second mentioned clutch member is driven by and at a higher speed than the speed of said main driving shaft; and a driving member operatively connected with said transmission shaft and which member is movable into interlocking engagement with one or the other of said clutch members, to thereby cause said transmission shaft to be driven either at the same speed as that of said driving shaft or at a higher speed than the speed of said driving shaft.

7. In change speed transmission gearing for motor driven vehicles, and in combination, a main driving shaft; a transmission shaft arranged in alignment with said driving shaft; a counter shaft arranged to one side of said main driving and transmission shafts; gearing whereby said counter shaft is driven by said main driving shaft; a plurality of cooperating pairs of gears carried by said counter and transmission shafts and whereby the latter may be driven at a plurality of speeds by said counter shaft; a clutch member carried by said main driving shaft; a second clutch member arranged adjacent said first mentioned clutch member; gearing whereby said second mentioned clutch member is driven by and at a higher speed than that of said main driving shaft; and a driving member slidable upon and non-rotatably connected with said transmission shaft and which member is movable into interlocking engagement with one or the other of said clutch members, to thereby cause said transmission shaft to be driven either at the same speed or at a higher speed than that of said driving shaft.

8. In change speed transmission gearing of the class described, a main driving shaft; a rotatable member having a gear, and a clutch member; a second rotatable member having two gears through one of which the first mentioned rotatable member may be driven, and through the other of which said second mentioned member may be driven from a gear carried by said main driving shaft; a second clutch member carried by said main driving shaft; a transmission shaft; means whereby said transmission shaft may be driven by and through either one of the clutch members aforesaid; and change speed mechanism whereby and through which said transmission shaft may be driven at a plurality of speeds from said main driving shaft.

In witness whereof, I have hereunto set my hand at Muncie, Indiana, this 31st day of August, A. D., one thousand nine hundred and twenty five.

JOHN M. SIMPSON.